Figure 4:
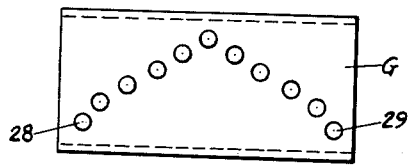

July 11, 1961
R. P. TURNER
2,991,807
CONDUIT
Filed June 4, 1956
2 Sheets-Sheet 1
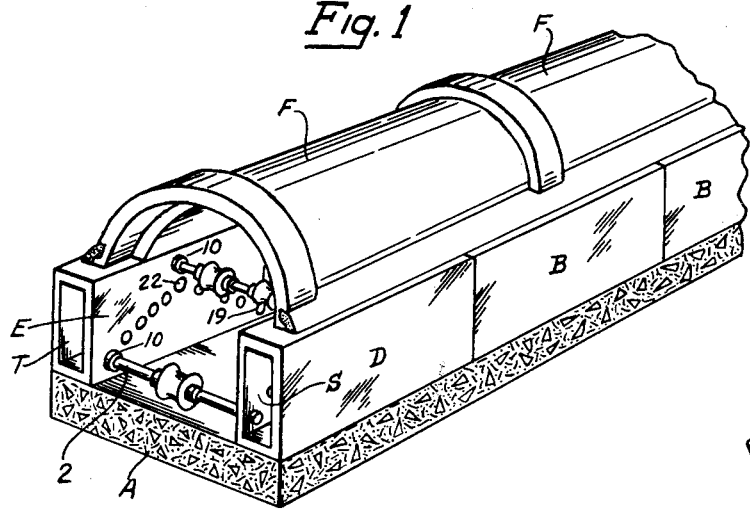
Fig. 1
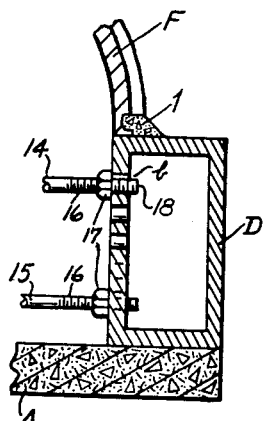
Fig. 11
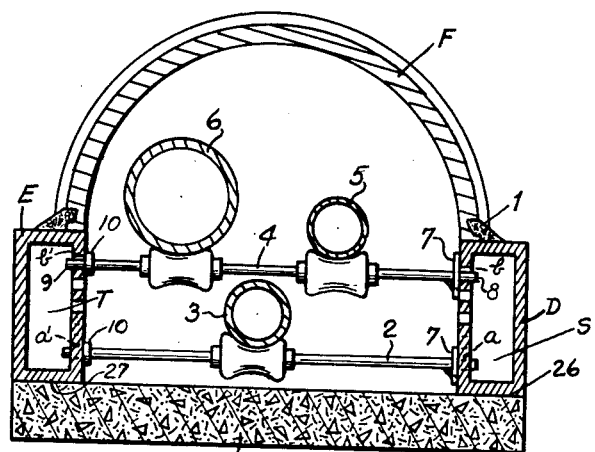
Fig. 2
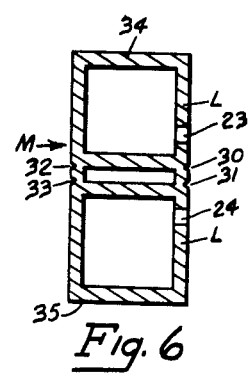
Fig. 6
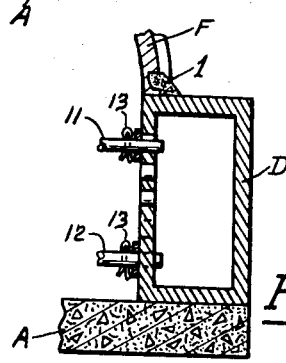
Fig. 3
INVENTOR.
ROLAND P. TURNER
BY
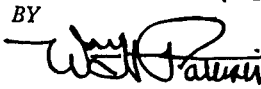
ATTORNEY July 11, 1961  R. P. TURNER  2,991,807
CONDUIT
Filed June 4, 1956
2 Sheets-Sheet 2

INVENTOR.
ROLAND P. TURNER
BY
ATTORNEY

United States Patent Office 2,991,807
Patented July 11, 1961

2,991,807
CONDUIT
Roland P. Turner, Cleveland, Ohio
(526 Melbourne Court, Charlotte 9, N.C.)
Filed June 4, 1956, Ser. No. 589,223
7 Claims. (Cl. 138—113)

This invention relates broadly to underground conduits which provide a water-tight housing for pipes which convey steam, hot water, refrigerated liquids or in fact any medium which is to be conveyed from one point to another but the invention pertains more particularly and specifically to a novel and improved manner of supporting the pipes in the conduit and provides an arrangement having many advantages, some of which will be hereinafter specifically recited, over the arrangements now and heretofore used for supporting pipes in such conduits.

One of the primary objects of the invention is to provide pipe supports which greatly reduce the cost not only of manufacture but also of transportation. Heretofore the pipe supporting elements have constituted a sizable item of the cost of a conduit and the cost of transporting said supports to the point of destination has proven of considerable expense. The present arrangement substantially practically eliminates these very material costs.

A further object of the invention is to reduce the cost of installation of the conduits. Heretofore the pipes have been supported on transversely extending bars or rods which in turn have been supported at each end upon special support elements. Both of these elements are conventionally composed of a metallic material. The present invention eliminates the necessity of installing the supports for the ends of the pipe supporting rods or bars as these supports have been entirely eliminated as the bars or rods are supported upon the side blocks of the conduit.

Another object of the invention is the provision of a novel pipe supporting construction which, in comparison with arrangements heretofore used, provides more room or space in the conduit with the consequence that in many cases a smaller conduit can be used yet house the same pipes heretofore housed in a larger conduit.

A still further object of the invention is the provision of a novel pipe support arrangement for conduits which eliminates deterioration from rust or electrolytic corrosion with the result that the conduit and pipes therein can be given a guarantee to have a life up to as high as 80 years, which has been impossible to even closely approach in installations as made heretofore. The only metal in the pipe support of the present invention will be the cross bars or rods and it is feasible, from a cost standpoint, to make these of a non-rusting metal and due to the fact that the pipes within the conduit are insulated from any contact with surfaces which might be wet, which has not been true of installations heretofore used, no electrolytic corrosion of the pipes or the pipe supporting bars occurs.

Another and very important object of the invention is the provision of novel and unique conduit side blocks for supporting the ends of the pipe supporting bars or rods and to construct these blocks in such a manner that they are interchangeable and thereby useable either at the right or left side of the conduit, and furthermore to so construct the blocks that blocks of different heights can be used at different points in the length of the conduit yet support the pipes in the conduit throughout the length of the conduit in the same horizontal planes.

Another and still further object of the invention is the provision of conduit side block pipe supports into which the pipe supporting rods or bars can be quickly and easily inserted after the side blocks have been laid and secured in place.

Another and still further object of the invention is the provision of ventilation of the conduit and this is provided by the conduit side blocks which by reason of their communication with the interior of the conduit through the apertures in their side walls provide a pair of air conducting flues extending throughout the length of each side of the conduit.

Other objects as well as advantages and improvements of the invention will be apparent to those familiar with this art and will appear from the following description when read in the light of the accompanying drawings.

Figure 5:
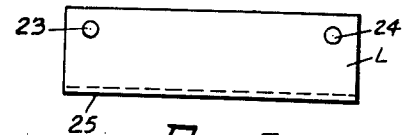
Figure 7:
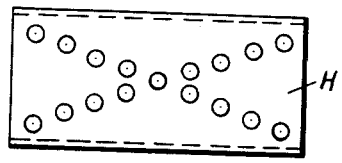
Figure 8:
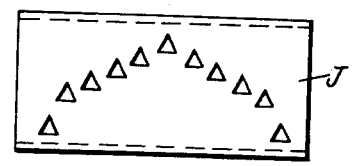
Figure 9:
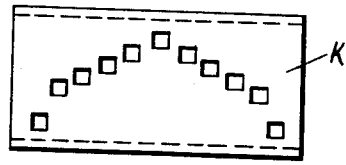
Figure 10:
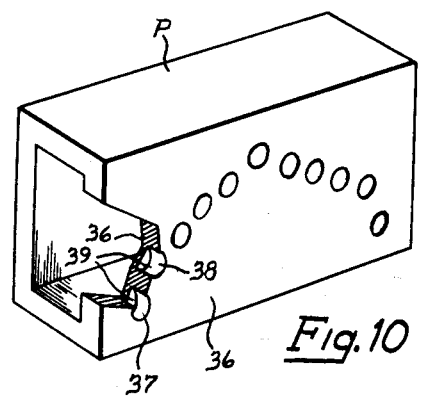
Figure 12:
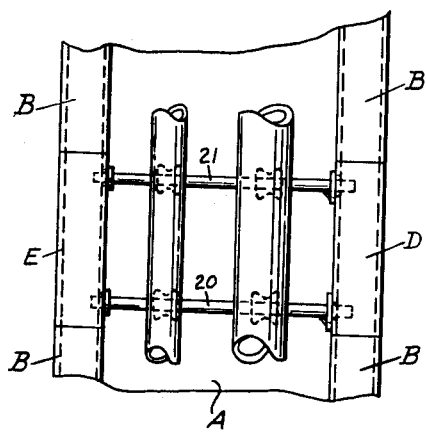

In the drawings:
FIG. 1 is a perspective view of a conduit, the interior of the conduit being visible through the open end thereof.
FIG. 2 is a vertical sectional view through the conduit.
FIG. 3 is a detailed vertical sectional view through a conduit side block, the ends of a pair of pipe supporting bars being illustrated in full line.
FIG. 4 is a side view of a modified form of a conduit side block.
FIG. 5 is a side view of another form of conduit side block.
FIG. 6 is a vertical sectional view through the side block of FIG. 5.
FIG. 7 is a side view of another form of conduit side block.
FIG. 8 is a side view of another form of conduit side block.
FIG. 9 is a side view of another form of conduit side block.
FIG. 10 is a perspective view of another and modified form of side block, a portion of the view being broken away and being shown in vertical section.
FIG. 11 is a vertical sectional view similar to FIG. 3, a modified form of pipe supporting bar securing means being illustrated.
FIG. 12 is a fragmentary top plan view of a conduit with the cover thereof removed, illustrating the use of a pair of pipe supporting bars supported in a pair of oppositely positioned conduit side blocks.

Conduits, usually positioned underground, have long been used for housing pipes which convey various mediums from one point to another. Various constructions have been used in conduits for supporting the bars which in turn support the pipes within the conduit. Numerous patents have been issued on supports for pipe bar supporting rods but in all instances the supporting means for the pipe supporting bars have been instrumentalities which are separate devices from the side blocks of the conduits. These supports have therefore added to the expense of a conduit and inasmuch as they are within the conduit they utilize some of the interior space thereof which is not desirable and additionally these supports have commonly been metallic in nature with the result that they rust and corrode. This gives the supports a limited life and they must be replaced from time to time which is a very expensive procedure when the conduit is underground. It will also be obvious that the supports must be transported from their point of origin to the location where the conduit is being laid and this due to transportation costs greatly increases the cost of the conduit installation.

In the present arrangement or system the separate supports for the pipe supporting bars are eliminated and the pipe supporting bars are supported directly on or in certain pairs of novel and unique side blocks disposed at spaced intervals along the length of the conduit.

Before describing the invention in detail it should be pointed out that in laying a conduit a base or bottom slab is provided in the bottom of the trench along which the conduit extends. In ordinary practice pipe supporting bars are provided at 10-foot spaced intervals along the length of the conduit. Obviously the exact spacing of these bars is optional. Assuming that the conventional 10-foot spacing of the pipe supporting bars is to be followed the next step is the positioning of those side blocks which will support the pipe supporting bars. Accordingly at 10-foot intervals along the length of the base slab a pair of blocks is positioned at opposite sides of the slab. The next step is the installation of the pipe supporting bars. The number of pipe supporting bars extending transverse the conduit between a pair of side blocks is dependent upon the number and sizes of the pipes to be housed within the conduit. In the drawings two pipe supporting bars are illustrated at each station that is extending between a pair of side blocks. Obviously the number or courses of pipe supporting bars can be varied from one to several and provision for accommodating several pipe supporting bars at a station is provided for as will hereinafter more clearly appear. The conduit is completed by closing in the side walls of the conduit by laying the side blocks to fill the gaps between the previously laid side blocks which have the pipe supporting bars therein or thereon and then laying or placing the cover on the conduit.

A conduit may start out carrying or housing a great many pipes and end up carrying only one or two pipes for the reason that at points throughout its length pipes may lead off into supplemental conduits. As the number of pipes within the conduit decreases it is customary to reduce the overall size of the conduit and this is done by reducing the heights of the conduit side blocks. In a length of conduit it is not unusual to use side blocks of three different heights starting with the taller blocks and ending up with the blocks of lesser height. To provide for the utilization of the present inventive concept the side blocks which support the pipe supporting bars are so designed and constructed as to permit the use of the taller blocks the intermediate height blocks, or the shorter blocks yet support the pipe supporting bars at the same height, that is in the same horizontal plane, so that the pipes throughout the length of the conduit are level.

A conduit is ordinarily ceramic in nature being made of clay, cement or like material as it has been found that the life of such a conduit is much greater than that of a metallic conduit. The present conduit is ceramic in nature and the only metal is the pipe supporting bars and the pipes supported thereby.

Describing the invention in detail in the light of the preceding general over-all description of a conduit, and referring to FIGS. 1 and 2 of the drawings, A is the slab or base upon which the conduit is laid and forms the bottom of the conduit. Each side of the conduit is closed by hollow side blocks arranged in end to end abutting relationship. A plurality of ordinary or conventional side blocks B are positioned between spaced apart pipe bar supporting side blocks D along each side of the slab. For the purpose of clearer understanding the pipe bar supporting block at one side of the conduit is designated D and the oppositely positioned and similar block at the other side of the conduit is designated E. Utilizing the 10-foot spacing heretofore referred to, a pair of side blocks D and E would be positioned every 10 feet along the length of the conduit. The conduit top is in the form of a plurality of semi-circular shaped cover sections F arranged in end to end abutting relationship and supported upon the side blocks at either side of the slab. These covers are secured and waterproofed by some suitable material such as mortar 1.

Each of the blocks D and E is provided in a side face or wall with a plurality of apertures each of which is positioned at a different distance inwardly from the side edge of the block. So positioning the apertures makes it possible to dispose and support a pipe supporting bar at any one of a plurality of selected heights above the conduit bottom or slab A. The disposition and shapes of these apertures can vary greatly, as will hereinafter appear, but at this time description will be limited to the blocks D and E and the pipe supporting bars illustrated in combination therewith.

In addition to the apertures being placed at different heights they are also positioned in different vertical planes. As a consequence of this a pipe supporting bar can be positioned at different points along the length of a block. The apertures in the blocks D and E by reason of their dispositions in the blocks form an inverted Y. A pipe supporting bar 2 is illustrated as being supported in the lowermost apertures $a$ and $a^1$ in the near ends of the blocks D and E and this bar supports a single and comparatively small pipe 3. A second pipe supporting bar 4 is supported in the uppermost block apertures $b$ and $b^1$. This bar supports a small pipe 5 and a larger pipe 6. It will be understood that the interior of the conduit is completely filled with some suitable insulating material in conventional practice although in some instances the pipes themselves are insulated individually but as this matter of insulation forms no part of the invention further mention of it is unnecessary.

It has been previously explained that blocks D and E are laid before the pipe supporting bars are inserted or positioned. Inasmuch as these bars are longer than the distance between the faces of the opposed blocks provision must be made to permit the bars to be inserted. To this end all of the apertures are of greater diameter or size than the diameter of cross sectional size of the bars. By holding the bars at an angle of inclination to the vertical one end of a bar can be inserted in the aperture in one block and slid thereinto and then the bar can be lowered and the opposite end of the bar inserted in the aperture in the other block. Once the bars are in place provision must also be made for holding the bars against longitudinal movement to prevent any possibility of the bars dropping.

Several constructions can be provided to take care of the situation outlined above. In the arrangement illustrated in FIGS. 1 and 2 a Tinnerman type nut or lock washer 7 is provided on the end 8 of a bar such as the bar 4. Adjacent but inward of the opposite end 9 of the bar a collar 10 is provided which is of a size too large to enter the aperture in the supporting block. By sliding the Tinnerman washer inwardly on the bar 4 the end 8 of the bar can be inserted in the aperture $b$ of the block D a distance sufficient to permit the opposite end 9 of the bar to be inserted in the aperture $b^1$ of the block E. The bar 4 is then slid longitudinally until the collar 10 abuts the face of the block E. The Tinnerman lock washer is then slid outwardly until it abuts the inner face of the block D as clearly illustrated in FIG. 2 of the drawings. The bar will now be held against longitudinal movement and against any possibility of either of its ends becoming disengaged with its respective supporting block aperture.

Other constructional arrangements which will provide for the insertion and placement of the bars and holding them against longitudinal movement is illustrated in FIGS. 3 and 11.

In FIG. 3 it is contemplated that the bars 11 and 12 be provided at one end with a collar 10 as has been described. In place of the described Tinnerman washer a cotter-key 13 can be utilized.

In FIG. 11 it is contemplated that the pipe supporting bars 14 and 15 be provided at one end with a collar 10 as has been described while their opposite and illustrated ends are threaded as at 16 and carry a nut 17. The nut 17 can be backed inwardly along the bar sufficiently far as to permit the insertion of the end 18 of the bar sufficiently far into the hollow supporting block as to permit the placement of the other end of the bar in the opposite supporting block. The nut can then be rotated until it abuts the inner face of the supporting block as illustrated in FIG. 11.

From the description thus far given it will be seen that the pipe bar supporting blocks have the very desirable attribute of being reversible. The positions of the blocks D and E for instance can be reversed with the result that no care be taken to position a block on any particular side of the conduit. This attribute is of the utmost importance and value. It not only simplifies manufacture but also speeds up the laying of the conduit and avoids any possibility of error on the part of the workmen. With the construction illustrated in FIG. 1 it will be seen that if a block E were substituted for block D the pipe supporting bar 2 would be supported in the aperture 19 due to the reason that what is the far end of the block E in FIG. 1 would be the near end of the block were the block laid to assume the position of block D.

This matter of reversibility of the pipe bar supporting blocks is inherent in all of the blocks which will be hereinafter described and is inherent irrespective of the height of the blocks used, that is to say, a pair of blocks of lesser height can be used at either side of the conduit just as has been described in respect to the blocks D and E.

The blocks D and E, as well as all of the blocks hereinafter to be described, also lend themselves to another arrangement. Under certain circumstances due to possibly the size of a pipe or pipes and the consequent weights thereof or to the nature of the medium carried by the pipes and its weight it might be found that a single pipe supporting bar would not be sufficiently strong. It is conventional to make all pipe supporting bars of the same size and strength and rather than to modify this the use of two supporting bars at each pipe supporting station might be found desirable or necessary.

By reference to FIG. 12 it will be seen that this can be taken care of merely by use of two pipe supporting bars wherein one bar 20 is supported in oppositely positioned apertures at one end of the blocks D and E and a second pipe supporting bar 21 is supported in oppositely positioned apertures in the opposite ends of the blocks D and E. All of these apertures would lie in the same horizontal plane. As for instance, the apertures in the block E could be the apertures $a^1$ and 19 which both lie in the same horizontal plane. The apertures utilized in the block D would be those apertures which are opposite and mating to the apertures $a^1$ and 19 of block E.

It has been mentioned that pipe bar supporting blocks of different heights can be utilized in the length of the conduit and still assure that the pipe supporting bars are all disposed in the same horizontal plane. The construction and arrangement which makes this possible will now be explained.

The blocks D and E represent the tallest blocks. Block G, see FIG. 4, is a block of intermediate height as are also the blocks H, J and K of FIGS. 7 to 9 inclusive. The block L of FIG. 5 is the least tall of the pipe supporting bar blocks. By reference to FIG. 1 of the drawings it will be seen that there are eight courses of apertures by which is meant there are apertures disposed at different horizontal levels of the height of the block face. The block of FIG. 4 which is of intermediate height has only six courses of apertures. The apertures $b^1$ and 22 have been omitted. The apertures in this block as to their positioning match up exactly with the other and remaining apertures in the blocks D and E. The block G, it will be apparent, could support one or more pipe supporting bars. The block L which is the least tall and would be utilized with a conduit of much reduced size with the consequence that the conduit would of necessity be housing a lesser number of pipes. Therefore a single pipe supporting bar would be all that would be needed. This block L has only a single course of pipe receiving apertures. These apertures 23 and 24 are the exact same distance above the bottom 25 of the block as is the lowermost course of apertures $a$ and $a^1$ above the bottoms 26 and 27 of the blocks D and E and this is also true as respects the lowermost course of apertures 28 and 29 of the block G. Consequently either of the apertures 23 or 24 of block L would serve to support the pipe supporting bar 2 in exactly the same horizontal plane as that bar is being supported in FIGS. 1 and 2 of the drawings and as that bar would be supported in the apertures 28 and 29 of block G.

Block H is merely an illustration of a different arrangement of pipe receiving apertures which might be adopted and which would provide selective height positioning of the pipe supporting bars. This arrangement would also provide variables as to the positioning of the pipe supporting bars in respect to the length of the block.

FIGS. 8 and 9 are merely illustrative of the fact that the apertures in the blocks need not necessarily be circular in configuration. The apertures of block K are square while those in block J are triangular. The arrangement of the courses of apertures in the blocks K and J follow the layout of the arrangement of the courses of apertures as they are illustrated in block G.

For manufacturing reasons block L appearing in FIG. 5 of the drawings is made as a double block. Obviously this need not necessarily be the case but it has been found desirable to so manufacture it. As a double block it is designated as an entirety by M in FIG. 6. This block M makes two blocks L. After the block is manufactured it is split longitudinally on the split lines 30, 31, 32 and 33. The face 34 becomes the top of one block and the face 35 becomes the top of the other block. In other words, when the block is laid the split edge of it is laid downwardly on the bottom in contact with the conduit slab A. Each of the blocks is provided with the apertures 23 and 24.

A still further form which the blocks for supporting the pipe bars supports might take is illustrated in FIG. 10 of the drawings wherein the block P in one of its faces 36 is provided with a plurality of courses of pockets or sockets in place of the apertures hereinbefore described. It will be seen that each pocket or socket such as those designated 37 and 38 extend only partially through the block side wall or face with the result that each pocket has a comparatively thin bottom 39. The particular pocket to be used is determined by the height at which the pipe supporting bar is to be positioned. This having been determined the bottom of the pocket is knocked out so that the pipe bar can be manipulated, in the manner hereinbefore described, to position it in its supporting relationship with the block. These pockets like the apertures have an over-all diameter or size greater than that of the bar end it is to receive just as the apertures are larger than the pipe end which they receive. The disposition of these pockets or sockets in the block face can follow any of the patterns heretofore described and illustrated and this particular block has all the attributes and advantages of the apertured blocks as hereinbefore described. These pockets like the apertures can be of varied shapes such as square and rectangular.

By reason of the conduit side blocks being hollow and placed in end to end abutment the blocks at each side form what might be termed a continuous flue along each side of the conduit. In FIGS. 1 and 2 these flues have been designated S and T. The flues of course have communication with the interior of the conduit through the apertures in the inner faces of those side blocks which support the pipe supporting bars. Those familiar with this art know that a conduit generally extends between buildings and that if the length of the conduit is great enough it has periodically throughout its length manholes. Consequently the hollow blocks constituting the side walls of the conduit are open either into the buildings or into the manholes. Those familiar with this art know further that the conduit is laid at an inclination to the horizontal, that is, the conduit has a low and a high end. This not only provides for drainage in the event water by leakage or otherwise is present in the conduit, but also provides a draft in the flues which are constituted by the hollow blocks forming the side walls of the conduit. Those familiar with this art further know that when the pipes in the conduit are conducting heated or refrigerated fluents the conduit is packed with insulating material so as to insulate the pipe or pipes therein. This arrangement provides for a movement or circulation of air in and through the conduit which has been found to be desirable and advantageous in that the air moving lengthwise and crosswise of the conduit will quickly dry the insulation therein should the same become wet due to leakage in the conduit itself or in the fluent conveying pipes. This drying of the insulation or insulating material is greatly accelerated due to the air circulation provided and is highly important and is a vast improvement over conduits as heretofore known and used.

The drawings illustrate practical and desirable arrangements for embodying the inventive concepts, but departures from the specific arrangements and constructions illustrated can be made without departing from the inventive concept and the invention is to be limited only by the claims hereinafter following.

What I claim is:

1. In a conduit adapted to house a pipe and having therein a horizontal transversely extending pipe-supporting bar, a hollow open-ended side block forming a part of a side wall of the conduit, the block in one of its side walls being provided with an aperture, said aperture extending through the block side wall and communicating with the hollow interior of the block, and said pipe-supporting bar having a smaller cross sectional area than said aperture and being positioned with an end extending into and supported in said block aperture.

2. In a conduit adapted to house a pipe and having therein a transversely extending horizontal pipe-supporting bar, a pair of hollow open-ended side blocks oppositely positioned at the sides of the conduit and forming a part of the side walls of the conduit, the blocks in their opposing side walls being provided each with an aperture, said apertures extending through the block side walls and communicating with the hollow interior of the blocks, said apertures being disposed in the same horizontal plane to support said bar in a level horizontal position, and said pipe-supporting bar having a smaller cross sectional area than said apertures and positioned with its ends extending into and supported in the apertures of oppositely positioned side blocks.

3. A construction as defined in claim 2 wherein, the pipe-supporting bar is provided with means to prevent longitudinal movement of the bar in the block apertures.

4. A construction as defined in claim 2 wherein, the pipe-supporting bar adjacent one of its ends is provided with a collar to limit the extent of insertion of the bar into a block aperture, and movable means carried by the other end of the bar for abutment with the apertured face of the supporting block for holding the pipe-supporting bar against longitudinal movement in the apertures of the blocks.

5. In a conduit for enclosing a pipe, a conduit cover, a plurality of aligned hollow open ended side blocks below and supporting each side of the cover, a supporting base beneath the side blocks, the base and side blocks closing the sides and bottom of the conduit, a plurality of horizontal pipe-supporting bars extending transverse of the conduit and arranged at spaced points along the length thereof for supporting a pipe, a plurality of pairs of oppositely positioned side blocks being pipe bar supporting blocks, said block pairs being disposed at spaced intervals along the length of the conduit, the inner and opposed side walls of each of said pairs of blocks each being provided with an aperture, said apertures extending through the block side walls and communicating with the hollow interiors of the blocks, the apertures in said side blocks being disposed in the same horizontal plane to support a pipe-supporting bar in a level horizontal position, and said pipe-supporting bars having smaller cross sectional areas than said apertures and positioned with their ends extending into and supported in the apertures of oppositely positioned side blocks.

6. In a conduit adapted to house a pipe and having therein a horizontal transversely extending pipe-supporting bar, a hollow side block forming a part of a side wall of the conduit, and the block in one of its side faces being provided with a socket extending partially through the wall of the block, and said socket having a fragile bottom which can be knocked out to provide an aperture of greater cross sectional area than said pipe-supporting bar and adapted to receive and support one end of the pipe supporting bar.

7. In a conduit for enclosing a fluent conveying pipe, a closed conduit having a bottom, side walls and a cover, the side walls of the conduit being provided with a plurality of hollow open ended side blocks, said side blocks being arranged in aligned end-to-end relationship so that the blocks form a longitudinal open ended flue extending longitudinally of the conduit, a plurality of blocks in each of the sides of the conduit provided with apertures which interconnect the hollow interiors of the blocks with the interior of the conduit, pipe-supporting bars of lesser cross sectional area than any one of said apertures having their remote ends supported in opposed apertures in opposed side blocks of the conduit, and a fluent conveying pipe extending longitudinally through the conduit.

References Cited in the file of this patent

UNITED STATES PATENTS

| | | |
|---|---|---|
| 836,017 | Douglass | Nov. 13, 1906 |
| 960,010 | Goldman | May 31, 1910 |
| 1,351,133 | Scharwath | Aug. 31, 1920 |
| 1,919,495 | Allen | July 25, 1933 |
| 1,969,879 | Eichner | Aug. 14, 1934 |
| 1,987,517 | Porter et al. | Jan. 8, 1935 |
| 2,230,306 | McDonald | Feb. 4, 1941 |
| 2,285,387 | Bartholomai | June 9, 1942 |
| 2,339,987 | Evans | Jan. 25, 1944 |

FOREIGN PATENTS

| | | |
|---|---|---|
| 604,729 | Great Britain | July 8, 1948 |